(12) United States Patent
Hu

(10) Patent No.: US 12,319,301 B2
(45) Date of Patent: Jun. 3, 2025

(54) METHOD AND DEVICE FOR VEHICLE CONTROL

(71) Applicant: BEIJING CHJ INFORMATION TECHNOLOGY CO., LTD., Beijing (CN)

(72) Inventor: Haibo Hu, Beijing (CN)

(73) Assignee: Beijing CHJ Information Technology Co., Ltd., Beijing (CN)

(*) Notice: Subject to any disclaimer, the term of this patent is extended or adjusted under 35 U.S.C. 154(b) by 72 days.

(21) Appl. No.: 18/553,108

(22) PCT Filed: Mar. 10, 2022

(86) PCT No.: PCT/CN2022/080236
§ 371 (c)(1),
(2) Date: Sep. 28, 2023

(87) PCT Pub. No.: WO2022/206337
PCT Pub. Date: Oct. 6, 2022

(65) Prior Publication Data
US 2024/0182048 A1    Jun. 6, 2024

(30) Foreign Application Priority Data
Apr. 2, 2021 (CN) .......................... 202110363695.X

(51) Int. Cl.
*B60W 50/00* (2006.01)
*B60L 3/00* (2019.01)
(Continued)

(52) U.S. Cl.
CPC ............. *B60W 50/029* (2013.01); *B60L 3/00* (2013.01); *B60W 30/06* (2013.01);
(Continued)

(58) Field of Classification Search
CPC .. B60W 50/029; B60W 30/06; B60W 50/082; B60W 2510/244;
(Continued)

(56) References Cited

U.S. PATENT DOCUMENTS

2016/0149429 A1   5/2016 [Kr]
2018/0111490 A1* 4/2018 Jang ........................ B60L 1/003
2019/0375298 A1* 12/2019 Symanow ............... B60L 50/61

FOREIGN PATENT DOCUMENTS

CN   102862471 A   1/2013
CN   107599854 A   1/2018
(Continued)

OTHER PUBLICATIONS

ISR for PCT application PCT/CN2022/080236.
(Continued)

*Primary Examiner* — Shardul D Patel

(57) ABSTRACT

A method and a device for vehicle control are disclosed. The method includes: in response to a driving mode switching instruction, detecting whether an electric quantity of a low-voltage battery of the vehicle is higher than a preset threshold value, the preset threshold value being determined according to an electric quantity value required for the vehicle to park; and when the electric quantity of the low-voltage battery is higher than the preset threshold value, controlling the vehicle to enter a target driving mode corresponding to the driving mode switching instruction.

20 Claims, 3 Drawing Sheets in response to a driving mode switching instruction, detecting whether an electric quantity of a low-voltage battery of the vehicle is higher than a preset threshold value, the preset threshold value being determined according to an electric quantity value required for the vehicle to park — S11 when the electric quantity of the low-voltage battery is higher than the preset threshold value, controlling the vehicle to enter a target driving mode corresponding to the driving mode switching instruction — S12

(51) Int. Cl.
B60W 30/06 (2006.01)
B60W 50/029 (2012.01)
B60W 50/08 (2020.01)

(52) U.S. Cl.
CPC ..... B60W 50/082 (2013.01); *B60W 2510/244* (2013.01); *B60W 2530/209* (2020.02); *B60W 2710/244* (2013.01)

(58) Field of Classification Search
CPC ..... B60W 2530/209; B60W 2710/244; B60W 60/0053; B60W 60/0051; B60W 50/0098; B60W 60/0015; B60W 2050/0043; B60W 50/00; B60L 3/00; B60L 2210/12; B60L 58/13; B60L 58/20; B60L 2260/20; Y02T 10/70; Y02T 10/72
USPC .......................................................... 701/25
See application file for complete search history.

(56) References Cited

FOREIGN PATENT DOCUMENTS

| CN | 108859768 A | 11/2018 |
| CN | 208801873 U | 4/2019 |
| CN | 110356465 A | 10/2019 |
| CN | 111605546 A | 9/2020 |
| CN | 113085879 A | 7/2021 |

OTHER PUBLICATIONS

English translation of ISR for PCT application PCT/CN2022/080236.
OA for CN application 202110363695.X.
English translation of OA for CN application 202110363695.X.

* cited by examiner

METHOD AND DEVICE FOR VEHICLE CONTROL

CROSS-REFERENCE TO RELATED APPLICATION

This application is the US national phase application of International Application No. PCT/CN2022/080236, filed on Mar. 10, 2022, the entire contents of which are incorporated herein by reference for all purposes.

TECHNICAL FIELD

The present disclosure relates to the field of vehicle control, and in particular, to a method and a device for vehicle control, and a storage medium.

BACKGROUND

A new energy vehicle is mainly powered by a traction battery when driving, and a DC converter converts high-voltage power of the traction battery into low-voltage power for low-voltage consumers in the vehicle to work. When the DC converter fails, the high-voltage power provided by the traction battery cannot drive the low-voltage consumers to work, which affects the driving safety of the vehicle. Particularly, when the vehicle is in automatic driving, sensors and controllers required for automatic driving are generally low-voltage consumers. In the absence of a low-voltage power supply, it is difficult to guarantee the safety of the automatic driving vehicle.

At present, it is possible to start a low-voltage battery of the vehicle to supply power to the low-voltage consumers of the vehicle after the DC converter fails. However, in situations where the DC converter fails and an electric quantity of the low-voltage battery of the vehicle is low, it is difficult for the low-voltage battery to continuously provide the electricity required for the low-voltage consumers, and there are still hidden dangers in the driving safety of the vehicle.

SUMMARY

A first aspect of the present disclosure provides a method for vehicle control. The method includes:
  in response to a driving mode switching instruction, detecting whether an electric quantity of a low-voltage battery of the vehicle is higher than a preset threshold value, the preset threshold value being determined according to an electric quantity value required for the vehicle to park; and
  when the electric quantity of the low-voltage battery is higher than the preset threshold value, controlling the vehicle to enter a target driving mode corresponding to the driving mode switching instruction.

In a second aspect, the present disclosure provides an electronic device. The electronic device includes a memory and a processor, a computer program is stored on the memory. The processor is configured to:
  in response to a driving mode switching instruction, detect whether an electric quantity of a low-voltage battery of the vehicle is higher than a preset threshold value, the preset threshold value being determined according to an electric quantity value required for the vehicle to park; and
  when the electric quantity of the low-voltage battery is higher than the preset threshold value, control the vehicle to enter a target driving mode corresponding to the driving mode switching.

In a third aspect, the present disclosure provides a computer-readable storage medium on which a computer program is stored. The program is executed by a processor to cause the computer to execute a method for vehicle control, the method includes:
  in response to a driving mode switching instruction, detecting whether an electric quantity of a low-voltage battery of the vehicle is higher than a preset threshold value, the preset threshold value being determined according to an electric quantity value required for the vehicle to park; and
  when the electric quantity of the low-voltage battery is higher than the preset threshold value, controlling the vehicle to enter a target driving mode corresponding to the driving mode switching instruction.

Other features and advantages of the present disclosure will be described in detail in the following detailed description.

BRIEF DESCRIPTION OF THE DRAWINGS

The accompanying drawings are used to provide a further understanding of the present disclosure, and constitute a part of the specification, and together with the following detailed description, are used to explain the present disclosure, but not to limit the present disclosure.

DETAILED DESCRIPTION

Specific embodiments of the present disclosure will be described in detail below with reference to the accompanying drawings. It should be understood that the specific embodiments described herein are only used to illustrate and explain the present disclosure, but not to limit the present disclosure.

The present disclosure is applied to a vehicle equipped with automatic driving or driving assistance functions. Automatic driving and driving assistance modes of the vehicle are implemented by relying on various types of sensors and controllers, and such driving consumers usually need to be supplied by low-voltage power. The vehicle includes a traction battery configured to provide driving power, a DC converter configured to convert the high-voltage power of the traction battery into low-voltage power for operations of other low-voltage consumers of the vehicle, and a low-voltage battery for power-on and emergency power supply of the vehicle, At present, in a case of a DC converter failure, the electric quantity of the low-voltage battery may not be enough for the vehicle in the automatic driving mode or driving assistance mode to perform emergency stop, which makes the driving safety of the vehicle not guaranteed.

The present disclosure can detect whether the electric quantity of the low-voltage battery of the vehicle is sufficient for parking before the vehicle enters the automatic driving mode or driving assistance mode, and the vehicle cannot enter the automatic driving or driving assistance mode when the low-voltage battery power is insufficient for parking. In this way, after entering the automatic driving mode or driving assistance mode, even if the DC converter fails, the electric quantity of the power of the low-voltage battery is sufficient for the vehicle to park, which can improve the driving safety of the vehicle.

The present disclosure can also limit the power consumption of the non-driving consumers in the low-voltage consumers after the DC converter fails, so that the electric quantity of the low-voltage battery is provided to the driving consumers of the vehicle, so as to increase the range of the vehicle after the DC converter fails.

Figure 1:
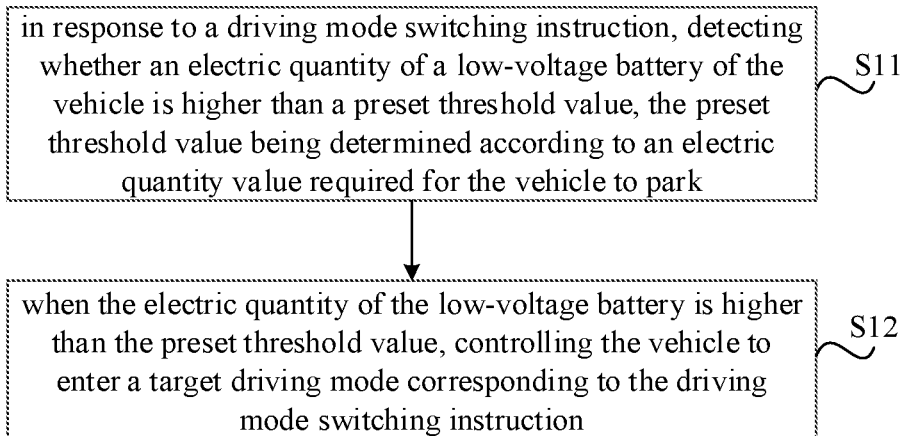
FIG. 1 is a flowchart of a method for vehicle control according to an embodiment of the present disclosure.

FIG. 1 is a flowchart of a method for vehicle control according to an embodiment. As shown in FIG. 1, the method includes the following steps.

In S11, in response to a driving mode switching instruction, it is detected whether an electric quantity of a low-voltage battery of the vehicle is higher than a preset threshold value, the preset threshold value is determined according to an electric quantity value required for the vehicle to park.

The driving mode switching instruction may be obtained by obtaining a user's click operation on a function button configured to control the vehicle to enter a target driving mode, via a control terminal of the vehicle (such as a vehicle-mounted terminal, a vehicle host, etc.). The button may be a physical button (e.g., an "automatic driving mode" button on a main control panel of the vehicle), or a virtual button (e.g., a virtual button on a display screen of the vehicle terminal). The driving mode switching instruction may also be obtained by recognizing a user's voice message. The driving mode switching instruction may also be triggered based on preset conditions for entering the target driving mode. For example, when the user sets the vehicle to enter the automatic driving mode after 5 minutes of power-on, the vehicle can automatically generate the driving mode switching instruction after 5 minutes of power-on, to put the vehicle into the automatic driving mode.

The target driving mode may be a driving assistance mode, an advanced driving assistance mode, an automatic driving mode, or other modes for assisting the driver in controlling the vehicle or automatically controlling the vehicle. Correspondingly, the driving mode switching instruction may be an instruction to switch to the driving assistance mode, an instruction to switch to the advanced driving assistance mode, an instruction to switch to the automatic driving mode, or an instruction to switch to other modes for assisting the driver in controlling the vehicle or automatically controlling the vehicle.

At present, the electric vehicle does not perform electric quantity detection before switching the driving mode, or the remaining electric quantity of the traction battery is detected instead of the electric quantity of the low-voltage battery. In this way, when the DCDC (DC converter) of the vehicle fails, the traction battery cannot supply power to the low-voltage consumers of the vehicle, and the low-voltage battery of the vehicle is low in electric quantity and cannot supply power to the low-voltage consumers of the vehicle, which will result in serious safety hazards for the vehicle in automatic driving mode or driving assistance mode.

In the present disclosure, after receiving the driving mode switching instruction, the electric quantity of the low-voltage battery can be detected, to ensure that the electric quantity of the low-voltage battery is sufficient to supply the low-voltage consumers for parking when the traction battery cannot supply power to the low-voltage consumers. This ensures the driving safety of the vehicle.

It is worth noting that the low-voltage battery mentioned in the present disclosure may be a low-voltage battery used for vehicle power-on in an electric vehicle, or a backup low-voltage battery used for emergency, which is not limited in the present disclosure.

The preset threshold value set in the present disclosure may be an electric quantity value required for automatic parking, an electric quantity value required for assisted parking, or an electric quantity value higher than one required for automatic parking or higher than one required for assisted parking. The preset threshold value may be determined according to an electric quantity value required for parking in the target driving mode corresponding to the driving mode switching instruction. For example, in a case that the driving mode switching instruction is to switch to the automatic driving mode, the preset threshold value may be an electric quantity value required for automatic parking in the automatic driving mode. In a case that the driving mode switching instruction is to switch to the driving assistance mode, the preset threshold value may be an electric quantity value required for assisted parking in the driving assistance mode.

Considering that voltage values output by a battery in different electric quantity states are different, an output voltage may not be able to drive low-voltage consumers when an SOC (State of Charge) is low. Therefore, in embodiments of the present disclosure, the electric quantity of the low-voltage battery may be an SOC value, and the preset threshold value is also a corresponding SOC threshold value. An SOC calibration value of each vehicle may be different, and the SOC threshold value may be set according to the SOC calibration value of the vehicle.

In S12, when the electric quantity of the low-voltage battery is higher than the preset threshold value, the vehicle is controlled to enter a target driving mode corresponding to the driving mode switching instruction.

When the electric quantity of the low-voltage battery is lower than the preset threshold value, the driving mode is not switched, and a warning that the driving mode cannot be switched due to the low electric quantity of the low-voltage battery may be issued.

In this way, when the DC converter fails, the low-voltage battery can be used to supply power to the low-voltage consumers of the vehicle, and the electric quantity of the low-voltage battery at this moment is sufficient to control the parking, reducing the driving risk when the DC converter of the vehicle fails.

In an implementation of the present disclosure, when the electric quantity of the low-voltage battery is lower than the preset threshold value, the traction battery is controlled to charge the low-voltage battery, and when it is detected that the electric quantity of the low-voltage battery is higher than the preset threshold value, a driving mode inquiry message is sent. The driving mode inquiry message is configured to inquire a user whether to enable a driving mode corresponding to the driving mode inquiry message.

The driving mode inquiry message may be displayed on a screen of the vehicle-mounted terminal, or may be broadcast by voice through a playback device of the vehicle. After the driving mode inquiry message is sent, instruction information of the user may also be acquired, and based on the instruction information of the user, it is determined whether to control the vehicle to switch the driving mode. The instruction information of the user may be obtained in the same way as the driving mode switching instruction, which will not be repeated here.

It is worth noting that when the electric quantity of the low-voltage battery is equal to the preset threshold value, the electric quantity of the low-voltage battery can supply the vehicle for parking, but it may not be able to provide an electric quantity required for emergency situations. Therefore, when the electric quantity of the low-voltage battery is equal to the preset threshold value, whether to control the vehicle to switch the driving mode can be flexibly set according to the requirements for the safety of the vehicle. That is to say, the step S12 in the present disclosure may also include "when the electric quantity of the low-voltage battery is higher than or equal to the preset threshold, controlling the vehicle to enter the target driving mode".

Through the above technical solutions, at least the following technical effects can be achieved:

Before the vehicle switches the driving mode, it is detected whether the electric quantity of the low-voltage battery is higher than the electric quantity value required for the vehicle to park, and the vehicle is controlled to switch the driving mode when the electric quantity of the low-voltage battery is higher than the electric quantity value required for the vehicle to park. In this way, when the vehicle is in the automatic driving mode or the driving assistance mode, and the DC converter of the vehicle fails, the electric quantity of the low-voltage battery is at least sufficient for the vehicle to park, thereby improving the safety of the vehicle.

Figure 2:
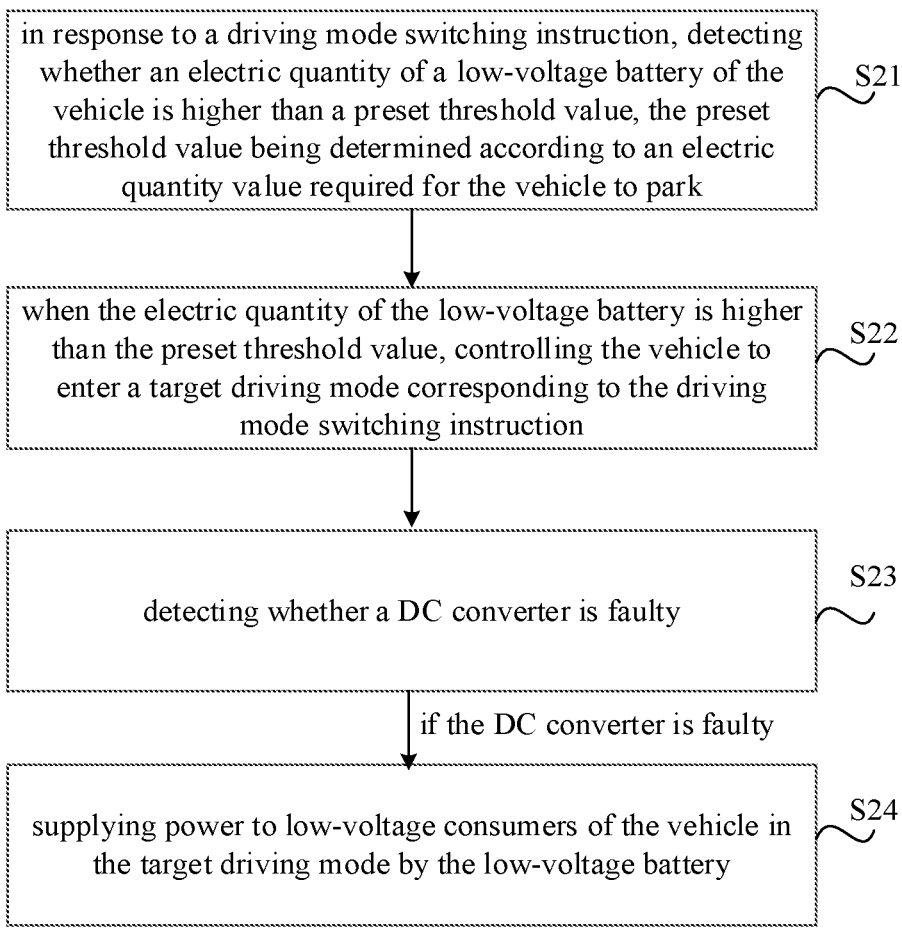
FIG. 2 is a flowchart of a method for vehicle control according to an embodiment of the present disclosure.

FIG. 2 is a flowchart of a method for vehicle control according to a disclosed embodiment. As shown in FIG. 2, the method includes the following steps.

In S21, in response to a driving mode switching instruction, it is detected an electric quantity of a low-voltage battery of the vehicle is higher than a preset threshold value. The preset threshold value is determined according to an electric quantity value required for the vehicle to park.

The driving mode switching instruction may be obtained by obtaining a user's click operation on a function button configured to control the vehicle to enter a target driving mode, via a control terminal of the vehicle (such as a vehicle-mounted terminal, a vehicle host, etc.). The button may be a physical button (e.g., an "automatic driving mode" button on a main control panel of the vehicle), or a virtual button (e.g., a virtual button on a display screen of the vehicle terminal). The driving mode switching instruction may also be obtained by recognizing a user's voice message. The driving mode switching instruction may also be triggered based on preset conditions for entering the target driving mode. For example, when the user sets the vehicle to enter the automatic driving mode after 5 minutes of power-on, the vehicle can automatically generate the driving mode switching instruction after 5 minutes of power-on, to put the vehicle into the automatic driving mode.

The target driving mode may be a driving assistance mode, an advanced driving assistance mode, an automatic driving mode, or other modes for assisting the driver in controlling the vehicle or automatically controlling the vehicle. Correspondingly, the driving mode switching instruction may be an instruction to switch to the driving assistance mode, an instruction to switch to the advanced driving assistance mode, an instruction to switch to the automatic driving mode, or an instruction to switch to other modes for assisting the driver in controlling the vehicle or automatically controlling the vehicle.

At present, the electric vehicle does not perform electric quantity detection before switching the driving mode, or the remaining electric quantity of the traction battery is detected instead of the electric quantity of the low-voltage battery. In this way, when the DCDC (DC converter) of the vehicle fails, the traction battery cannot supply power to the low-voltage consumers of the vehicle, and the low-voltage battery of the vehicle is low in electric quantity and cannot supply power to the low-voltage consumers of the vehicle, which will result in serious safety hazards for the vehicle in automatic driving mode or driving assistance mode.

In the present disclosure, after receiving the driving mode switching instruction, the electric quantity of the low-voltage battery can be detected, to ensure that the electric quantity of the low-voltage battery is sufficient to supply the low-voltage consumers for parking when the traction battery cannot supply power to the low-voltage consumers. This ensures the driving safety of the vehicle. It is worth noting that the low-voltage battery mentioned in the present disclosure may be a low-voltage battery used for vehicle power-on in an electric vehicle, or a backup low-voltage battery used for emergency, which is not limited in the present disclosure.

The preset threshold value set in the present disclosure may be an electric quantity value required for automatic parking, an electric quantity value required for assisted parking, or an electric quantity value higher than one required for automatic parking or higher than one required for assisted parking. The preset threshold value may be determined according to an electric quantity value required for parking in the target driving mode corresponding to the driving mode switching instruction. For example, in a case that the driving mode switching instruction is to switch to the automatic driving mode, the preset threshold value may be an electric quantity value required for automatic parking in the automatic driving mode. In a case that the driving mode switching instruction is to switch to the driving assistance mode, the preset threshold value may be an electric quantity value required for assisted parking in the driving assistance mode.

Considering that voltage values output by a battery in different electric quantity states are different, an output voltage may not be able to drive low-voltage consumers when an SOC (State of Charge) is low. Therefore, in embodiments of the present disclosure-, the electric quantity of the low-voltage battery may be an SOC value, and the preset threshold value is also a corresponding SOC threshold value. An SOC calibration value of each vehicle may be different, and the SOC threshold value may be set according to the SOC calibration value of the vehicle.

In S22, when the electric quantity of the low-voltage battery is higher than the preset threshold value, the vehicle is controlled to enter a target driving mode corresponding to the driving mode switching instruction.

When the electric quantity of the low-voltage battery is lower than the preset threshold value, the driving mode is not switched, and a warning that the driving mode cannot be switched due to the low electric quantity of the low-voltage battery may be issued. In an embodiment of the present disclosure, when the electric quantity of the low-voltage battery is lower than the preset threshold value, the traction battery is controlled to charge the low-voltage battery, and when it is detected that the electric quantity of the low-voltage battery is higher than the preset threshold value, a driving mode inquiry message is sent, the driving mode inquiry message is configured to inquire the user whether to enable a driving mode corresponding to the driving mode inquiry message.

The driving mode inquiry message may be displayed on a screen of the vehicle-mounted terminal, or may be broadcast by voice through a playback device of the vehicle. After the driving mode inquiry message is sent, instruction information of the user may also be acquired, and based on the instruction information of the user, it is determined whether to control the vehicle to switch the driving mode. The instruction information of the user may be obtained in the same way as the driving mode switching instruction, which will not be repeated here.

It is worth noting that when the electric quantity of the low-voltage battery is equal to the preset threshold value, the electric quantity of the low-voltage battery can supply the vehicle for parking, but it may not be able to provide an electric quantity required for emergency situations. Therefore, when the electric quantity of the low-voltage battery is equal to the preset threshold value, whether to control the vehicle to switch the driving mode can be flexibly set according to the requirements for the safety of the vehicle. That is to say, the step S22 in the present disclosure may also include "when the electric quantity of the low-voltage battery is higher than or equal to the preset threshold, controlling the vehicle to enter the target driving mode". In S23, it is detected whether the DC converter is faulty, and in a case that the DC converter is faulty, perform step S24.

Figure 3:
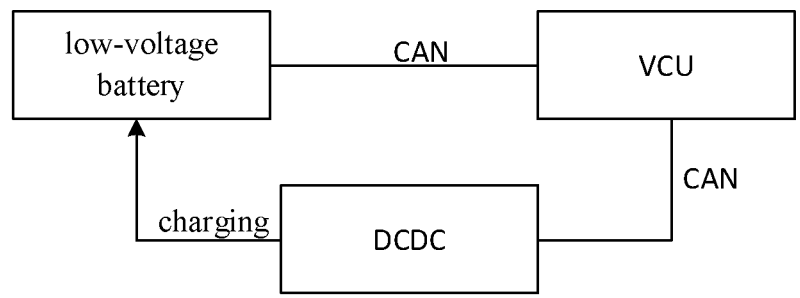
FIG. 3 is a schematic diagram illustrating a connection relationship between a DC converter, a low-voltage battery, and a vehicle control unit according to an embodiment of the present disclosure.

FIG. 3 is a schematic diagram of a connection relationship between a DC converter, a low-voltage battery and a vehicle control unit. As shown in FIG. 3, the DC converter DCDC and VCU (Vehicle Control Unit) have a communication connection relationship through CAN (Controller Area Network), VCU and low-voltage battery have a communication connection relationship through CAN, DCDC and the low-voltage battery have an electrical connection relationship, and the low-voltage battery can be charged through the DCDC. Based on the above connection relationship, the VCU can obtain the fault message sent by the DC converter to determine whether the DCDC is faulty. The VCU can periodically send a detection signal to the DCDC and obtain a feedback signal of the DCDC to detect whether the DCDC fails. Whether the DCDC fails can be determined by detecting the electrical connection relationship with the DCDC by a detection unit of the low-voltage battery. If the electrical connection between the DC converter DCDC and the low-voltage battery is disconnected, it is determined that the DC converter DCDC is faulty. The low-voltage battery and VCU can send DCDC status data to each other through CAN.

In S24, the driving consumer of the vehicle in the target driving mode is supplied with power by the low-voltage battery.

The low-voltage consumers of the vehicle include driving consumers and non-driving consumers. The driving consumers may include a VCU, an MCU (Microcontroller Unit), an EPS (Electric Power Steering), an ABS (antilock brake system), an ESP (Electronic Stability Program) and other automatic driving related controllers for controlling the driving safety. The non-driving consumers may include a lighting system, an audio-visual entertainment system, and other consumers for a door, windows, a wiper, seat heating and the like. The driving consumers are configured to control driving or provide driving assistance, and are more critical in automatic driving and driving assistance modes, while the non-driving consumers have little impact on the driving safety of the vehicle. Therefore, the electric quantity of the low-voltage battery can be supplied to the driving consumers, while an electric quantity for the non-driving consumer can be limited, so as to increase the range of the vehicle after the failure of the DC converter.

Before that, the driving consumer corresponding to the target driving mode can be determined, and a correspondence relationship between respective driving modes and the driving consumers can be set in advance according to the requirements of the driving modes. For example, in the automatic driving mode, all the driving consumers may be enabled, so the driving consumers corresponding to the automatic driving mode may be all the driving consumers. In the driving assistance mode, the types of the driving consumers that need to be enabled are less than those required for the automatic driving mode. Therefore, the driving consumers required for the driving assistance mode can be set as the driving consumers corresponding to the driving assistance mode.

In an implementation of the present disclosure, environmental information may be detected to determine whether the environmental information belongs to one of a plurality of preset environmental information. If the environmental information belongs to one of the plurality of preset environmental information, a target consumer corresponding to the environmental information is determined based on a correspondence relationship between respective environmental information and the non-driving consumers, and the driving consumer corresponding to the target driving mode and the target consumer are supplied with power by the low-voltage battery.

The preset environment information and the correspondence relationship between the preset environment information and the non-driving consumers may be determined based on the target driving mode. For example, a lighting lamp of the vehicle not only affects its own driving safety, but also affects the driving safety of other vehicles, so that in all driving modes, the preset environment information may include "light intensity lower than a preset intensity threshold value", and the non-driving consumer corresponding to the preset environment information is the lighting lamp. In this way, when it is detected that the light is weak or when it is in a preset night time period, the lighting lamp of the vehicle can be turned on to ensure the driving safety of other vehicles and pedestrians. In the driving assistance mode, the driver needs to observe a situation around the vehicle. If the vehicle does not turn on the wiper in rainy days, the driver's observation may be affected. Therefore, in the driving assistance mode, the preset environmental information may also include "the weather is rainy day", the non-driving consumer corresponding to the preset environmental information is the wiper. In the automatic driving mode, the vehicle will automatically obtain the information required for driving through the sensors, and the driver does not need to observe through a front glass of the vehicle. Therefore, the preset environmental information in the automatic driving mode may not include "weather is rainy".

In an implementation of the present disclosure, a driving destination and the electric quantity of the low-voltage battery may also be obtained, it is determined whether the electric quantity of the low-voltage battery is sufficient for the vehicle to drive to the driving destination, and when the electric quantity of the low-voltage battery is not sufficient for the vehicle to drive to the driving destination, the vehicle is controlled to park.

For example, a time required for the vehicle to travel to the destination may be calculated, and whether the electric quantity of the low-voltage battery is sufficient to travel to the destination may be determined by calculating power and usage frequencies of the consumers that are consuming electricity.

After it is determined to perform automatic parking, at least one parking space may also be presented to the user, and based on a parking space selected by the user, the vehicle is controlled to drive to the parking space and perform automatic parking. The at least one parking space may be a free parking space scanned by radar, or a parking area provided in map navigation, and the like.

In an implementation of the present disclosure, a drivable range of the vehicle may be determined based on the electric quantity of the low-voltage battery, a location selected by the user that is within the drivable range is obtained, and the location is determined as a new driving destination.

The drivable range can be displayed in the form of a target circle on a map, and the user may select any location within the target circle by clicking on the screen and set the location as a new driving destination. In some embodiments, after the drivable range is determined, a popular parking spot or a maintenance spot within the drivable range may be determined, and the spot may be recommended to the user, and after it is determined that the user accepts the recommendation, the spot is regarded as a new driving location destination.

In an implementation of the present disclosure, when the electric quantity of the low-voltage battery is sufficient for the vehicle to drive to the destination, power supply for the non-driving consumer is restored. Considering that there may be other unexpected situations that require electricity during driving, a power supply restoration threshold value may be determined based on the electric quantity required by the vehicle to drive to the destination. For example, when the SOC required by the vehicle to drive to the destination is 40%, the power supply restoration threshold value can be set to 55% SOC. That is, when the SOC of the low-voltage battery reaches 55%, the power supply for the non-driving consumer is restored. The SOC required for driving to the destination and the SOC corresponding to the power restoration threshold value can be regularly updated according to a real-time power consumption and real-time mileage. After each update, if it is determined that the current SOC of the vehicle is lower than the updated power supply restoration threshold, the power supply for the non-driving consumer that has been restored is stopped.

Due to limited power resources, when restoring power supply to the non-driving consumer, it may be determined to supply power to the non-driving consumer corresponding to the obtained environmental information according to the obtained environmental information and the correspondence relationship between the environmental information and the consumers. For example, when the temperature information in the acquired environmental information is lower than a certain threshold, heating of a seat cushion may be restored.

In an implementation of the present disclosure, a list of non-driving consumers to be restored for power supply may also be presented, at least one target non-driving consumer to be restored for power supply selected by the user is determined, and power supply for the target non-driving consumer is restored.

Through the above technical solutions, at least the following technical effects can be achieved:

Before the vehicle switches the driving mode, it is detected whether the electric quantity of the low-voltage battery is higher than the electric quantity value required for the vehicle to park, and the vehicle is controlled to switch the driving mode when the electric quantity of the low-voltage battery is higher than the electric quantity value required for the vehicle to park. In this way, when the DC converter of the vehicle fails in the automatic driving mode or the assisted driving mode, by using the low-voltage battery to supply power to the driving consumer and limiting the electricity consumption of the non-driving consumer, the electricity consumption of the non-driving consumer is saved for supply the operation of the driving consumer, which increases the range of the vehicle in the event of the DC converter failure, thereby improving the safety of the vehicle.

Figure 4:
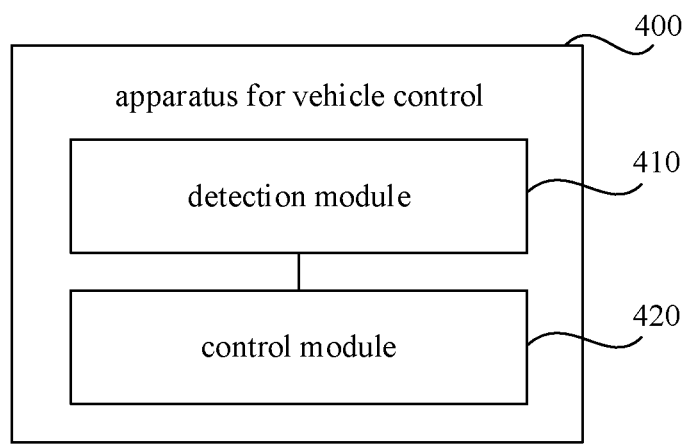
FIG. 4 is a block diagram of an apparatus for vehicle control according to an embodiment of the present disclosure.

FIG. 4 is a block diagram of an apparatus for vehicle control according to an embodiment of the present disclosure. As shown in FIG. 4, the vehicle control device 400 includes:

a detection module 410, configured to, in response to a driving mode switching instruction, detect whether an electric quantity of a low-voltage battery of the vehicle is higher than a preset threshold value, the preset threshold value being determined according to an electric quantity value required for the vehicle to park; and a control module 420, configured to control the vehicle to enter a target driving mode corresponding to the driving mode switching instruction when the electric quantity of the low-voltage battery is higher than the preset threshold value.

In an implementation of the present disclosure, the apparatus further includes a charging module, configured to control a traction battery to charge the low-voltage battery when the electric quantity of the low-voltage battery is lower than the preset threshold value; and when detecting the electric quantity of the low-voltage battery is higher than the preset threshold, to send a driving mode inquiry message configured to inquire a user whether to enable a driving mode corresponding to the driving mode inquiry message.

In an implementation of the present disclosure, the apparatus further includes a power supply module, configured to detect whether a DC converter is faulty; and in a case that the DC converter is faulty, to supply power to low-voltage consumers of the vehicle in the target driving mode by the low-voltage battery.

In an implementation of the present disclosure, the low-voltage consumers of the vehicle include driving consumers and non-driving consumers, and the power supply module is configured to determine a driving consumer corresponding to the target driving mode; and supply power to the driving consumer corresponding to the target driving mode by the low-voltage battery.

In an implementation of the present disclosure, the power supply module is further configured to detect environmental information, based on a correspondence relationship between respective environmental information and non-driving consumers, determine a target consumer corresponding to the environmental information; and to supply power to the driving consumer corresponding to the target driving mode and the target consumer by the low-voltage battery.

In an implementation of the present disclosure, the power supply module is further configured to detect an electrical connection state between the DC converter and the low-voltage battery, and if the electrical connection between the DC converter and the low-voltage battery is disconnected, to determine that the DC converter is faulty.

In an implementation of the present disclosure, the apparatus further includes a processing module, configured to obtain a driving destination and the electric quantity of the low-voltage battery; and to determine whether the electric quantity of the low-voltage battery is sufficient for the vehicle to drive to the driving destination, and to control the vehicle to park when the electric quantity of the low-voltage battery is insufficient for the vehicle to drive to the driving destination.

In an implementation of the present disclosure, the processing module is further configured to present at least one parking space to the user, and based on a parking space selected by the user, to control the vehicle to drive to the parking space and automatically park.

In an implementation of the present disclosure, the processing module is further configured to determine a drivable range of the vehicle based on the electric quantity of the low-voltage battery; to obtain a location selected by the user that is within the drivable range; and to determine the location as a new driving destination.

In an implementation of the present disclosure, the apparatus further includes a restoration module, configured to determine whether the electric quantity of the low-voltage battery is sufficient for the vehicle to drive to the driving destination, and when the electric quantity of the low-voltage battery is sufficient for the vehicle to drive to the driving destination, to restore power supply for the non-driving consumer.

In an implementation of the present disclosure, the restoration module is further configured to present a list of non-driving consumers to be restored for power supply; to determine at least one target non-driving electric consumer to be restored for power supply selected by the user; and to restore power supply for the target non-driving consumer.

In some embodiments, the driving mode switching instruction includes an instruction characterizing a switch to an automatic driving mode and an instruction characterizing a switch to a driver assistance mode.

Regarding the apparatus in the above-mentioned embodiment, the specific manner in which each module performs operations has been described in detail in the embodiment of the method, and will not be described in detail here.

Through the above technical solutions, at least the following technical effects can be achieved:

Before the vehicle switches the driving mode, it is detected whether the electric quantity of the low-voltage battery is higher than the electric quantity value required for the vehicle to park, and the vehicle is controlled to switch the driving mode when the electric quantity of the low-voltage battery is higher than the electric quantity value required for the vehicle to park. In this way, when the vehicle is in the automatic driving mode or the driving assistance mode, and the DC converter of the vehicle fails, the electric quantity of the low-voltage battery is at least sufficient for the vehicle to park, thereby improving the safety of the vehicle.

Figure 5:
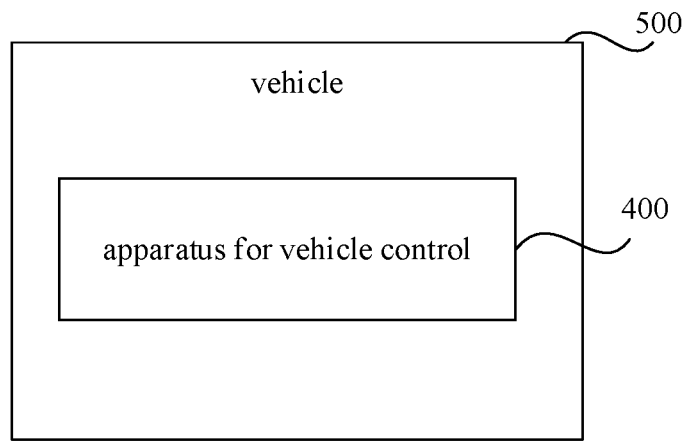
FIG. 5 is a block diagram of a vehicle according to an embodiment of the present disclosure.

FIG. 5 is a block diagram of a vehicle according to an embodiment of the present disclosure. As shown in FIG. 5, the vehicle 500 includes the apparatus for vehicle control 400 in the above-mentioned embodiment, and the steps of each method in the above-mentioned embodiment can be implemented.

Figure 6:
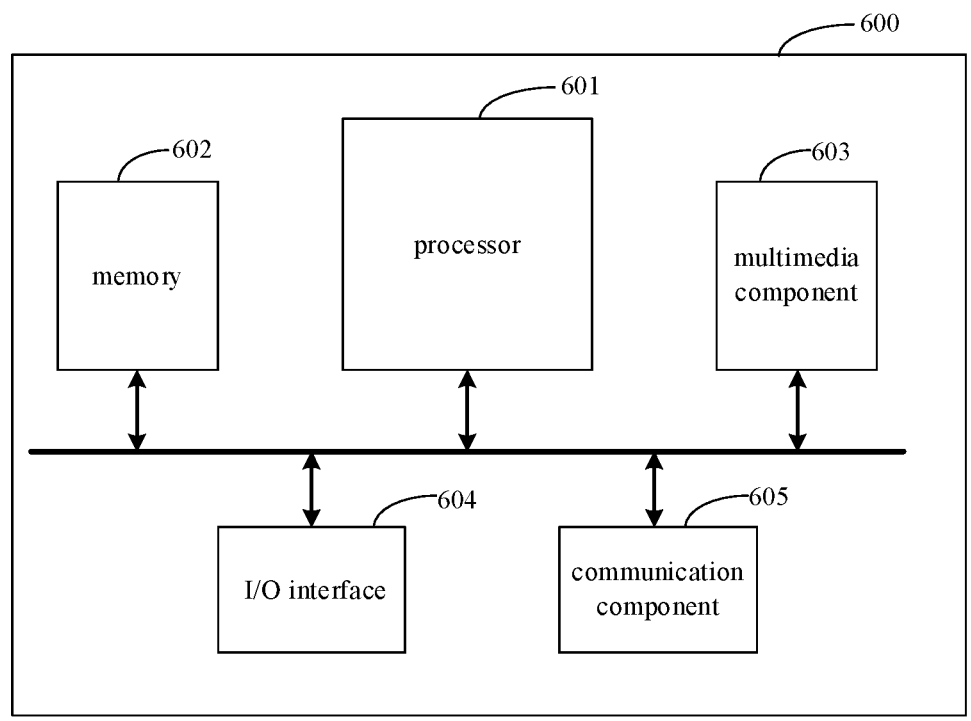
FIG. 6 is a block diagram of an electronic device according to an embodiment of the present disclosure.

FIG. 6 is a block diagram of an electronic device 600 according to an embodiment of the present disclosure. As shown in FIG. 6, the electronic device 600 may include: a processor 601 and a memory 602. The electronic device 600 may further include one or more of a multimedia component 603, an input/output (I/O) interface 604, and a communication component 605.

In an implementation of the present disclosure, the processor is configured to:
in response to a driving mode switching instruction, detect whether an electric quantity of a low-voltage battery of the vehicle is higher than a preset threshold value, the preset threshold value being determined according to an electric quantity value required for the vehicle to park; and
control the vehicle to enter a target driving mode corresponding to the driving mode switching instruction when the electric quantity of the low-voltage battery is higher than the preset threshold value.

In an implementation of the present disclosure, the processor is configured to:
control a traction battery to charge the low-voltage battery when the electric quantity of the low-voltage battery is lower than the preset threshold value; and
send a driving mode inquiry message configured to inquire a user whether to enable a driving mode corresponding to the driving mode inquiry message, when detecting the electric quantity of the low-voltage battery is higher than the preset threshold.

In an implementation of the present disclosure, the processor is configured to:
detect whether a DC converter is faulty; and
in a case that the DC converter is faulty, supply power to low-voltage consumers of the vehicle in the target driving mode by the low-voltage battery.

In an implementation of the present disclosure, the low-voltage consumers of the vehicle include driving consumers and non-driving consumers, and the processor is configured to:
determine a driving consumer corresponding to the target driving mode; and
supply power to the driving consumer corresponding to the target driving mode by the low-voltage battery.

In an implementation of the present disclosure, the processor is configured to:
detect environmental information, and determine whether the environmental information belongs to one of a plurality of preset environmental information;
when the environmental information belongs to one of the plurality of preset environmental information, determine a target consumer corresponding to the environmental information based on a correspondence relationship between respective preset environmental information and the non-driving consumers; and
supply power to the driving consumer corresponding to the target driving mode and the target consumer by the low-voltage battery.

In an implementation of the present disclosure, the processor is configured to:
detect an electrical connection state between the DC converter and the low-voltage battery, and determine that the DC converter is faulty when the electrical connection between the DC converter and the low-voltage battery is disconnected.

In an implementation of the present disclosure, the processor is configured to:
obtain a driving destination and the electric quantity of the low-voltage battery; and
determine whether the electric quantity of the low-voltage battery is sufficient for the vehicle to drive to the driving destination, and control the vehicle to park when the electric quantity of the low-voltage battery is insufficient for the vehicle to drive to the driving destination.

In an implementation of the present disclosure, the processor is configured to:

present at least one parking space to the user, and based on a parking space selected by the user, control the vehicle to drive to the parking space and automatically park.

In an implementation of the present disclosure, the processor is configured to:
determine a drivable range of the vehicle based on the electric quantity of the low-voltage battery;
obtain a location selected by the user that is within the drivable range; and
determine the location as a new driving destination.

In an implementation of the present disclosure, the processor is configured to:
determine whether the electric quantity of the low-voltage battery is sufficient for the vehicle to drive to the driving destination, and when the electric quantity of the low-voltage battery is sufficient for the vehicle to drive to the driving destination, restore power supply for the non-driving consumer.

In an implementation of the present disclosure, the processor is configured to:
present a list of non-driving consumers to be restored for power supply;
determine at least one target non-driving consumer to be restored for power supply selected by the user; and
restore power supply for the target non-driving consumer.

In some embodiments, the driving mode switching instruction includes an instruction characterizing a switch to an automatic driving mode and an instruction characterizing a switch to a driver assistance mode. The processor 601 is configured to control the overall operations of the electronic device 600 to complete all or part of the steps in the above-mentioned method for vehicle control. The memory 602 is configured to store various types of data to support operations on the electronic device 600, such data may include, for example, instructions for any application or method operating on the electronic device 600, and application-related data, such as contact data, messages sent and received, pictures, audio, video, and so on. The memory 602 can be implemented by any type of volatile or non-volatile storage device or their combination, such as a static random access memory (SRAM for short), an electrically erasable programmable read-only memory (EEPROM for short), an erasable programmable read-only memory (EPROM), a programmable read-only memory (PROM for short), a read-only memory (ROM for short), a magnetic memory, a flash memory, a magnetic disk or an optical disk. The multimedia component 603 may include screen and audio components. The screen may be, for example, a touch screen, and the audio component is configured to output and/or input audio signals. For example, the audio component may include a microphone for receiving external audio signals. The received audio signal may be further stored in the memory 602 or transmitted via the communication component 605. The audio component also includes at least one speaker for outputting audio signals. The I/O interface 604 provides an interface between the processor 601 and other interface modules, and the above-mentioned other interface modules may be a keyboard, a mouse, a button, and the like. These buttons may be virtual buttons or physical buttons. The communication component 605 is configured for wired or wireless communication between the electronic device 600 and other devices. Wireless communication, such as Wi-Fi, Bluetooth, Near Field Communication (NFC for short), 2G, 3G, 4G, NB-IOT, eMTC, or other 5G, etc., or one or more of the combination thereof, which is not limited here. Therefore, the corresponding communication component 605 may include: Wi-Fi module, Bluetooth module, NFC module and so on.

In embodiments of the present disclosure, the electronic device 600 may be implemented by one or more application specific integrated circuits (ASICs for short), digital signal processors (DSPs for short), digital signal processing devices (DSPDs), Programmable Logic Devices (PLDs for short), Field Programmable Gate Array (FPGAs for short), controllers, microcontrollers, microprocessors or other electronic components, to execute the above-mentioned method for vehicle control.

The present disclosure also provides a computer-readable storage medium on which a computer program is stored, and when the program is executed by a processor, the method for vehicle control of the present disclosure is implemented.

In embodiments of the present disclosure, a computer-readable storage medium including program instructions is also provided. When the program instructions are executed by a processor, the steps of the above-mentioned method for vehicle control are implemented. For example, the computer-readable storage medium can be the above-mentioned memory 602 including program instructions, and the above-mentioned program instructions can be executed by the processor 601 of the electronic device 600 to implement the above-mentioned method for vehicle control.

The present disclosure also provides a computer program product. The computer program product includes computer program code, the computer program code is run on a computer to execute the method for vehicle control of the present disclosure.

The present disclosure also provides a computer program. The computer program includes computer program code that, when executed on a computer, causes the computer to execute the method for vehicle control of the present disclosure.

The preferred implementations of the present disclosure have been described above in detail with reference to the accompanying drawings. However, the present disclosure is not limited to the specific details of the above-mentioned implementations. Various simple modifications can be made to the technical solutions of the present disclosure within the scope of the technical concept of the present disclosure. These simple modifications all fall within the protection scope of the present disclosure.

In addition, it should be noted that the various specific technical features described in the above-mentioned specific implementations can be combined in any suitable manner unless they are inconsistent. In order to avoid unnecessary repetition, various possible combinations are not separately explained in the present disclosure.

In addition, the various implementations of the present disclosure can also be arbitrarily combined, as long as they do not violate the spirit of the present disclosure, they should also be regarded as the contents disclosed in the present disclosure.

What is claimed is:
1. A method for vehicle control, comprising:
in response to a driving mode switching instruction, detecting whether an electric quantity of a low-voltage battery of the vehicle is higher than a preset threshold value, the preset threshold value being determined according to an electric quantity value required for the vehicle to park; and
when the electric quantity of the low-voltage battery is higher than the preset threshold value, controlling the vehicle to enter a target driving mode corresponding to the driving mode switching instruction.

2. The method according to claim 1, further comprising:
when the electric quantity of the low-voltage battery is lower than the preset threshold value, controlling a traction battery to charge the low-voltage battery; and
when detecting that the electric quantity of the low-voltage battery is higher than the preset threshold value, sending a driving mode inquiry message configured to inquire a user whether to enable a driving mode corresponding to the driving mode inquiry message.

3. The method according to claim 1, further comprising:
detecting whether a DC converter is faulty; and
in a case that the DC converter is faulty, supplying power to low-voltage consumers of the vehicle in the target driving mode by the low-voltage battery.

4. The method according to claim 3, wherein the low-voltage consumers of the vehicle comprise driving consumers and non-driving consumers, and supplying power to the low-voltage consumers of the vehicle in the target driving mode by the low-voltage battery, comprises:
determining a driving consumer corresponding to the target driving mode; and
supplying power to the driving consumer corresponding to the target driving mode by the low-voltage battery.

5. The method according to claim 4, further comprising:
detecting environmental information, and determining whether the environmental information belongs to one of a plurality of preset environmental information;
when the environmental information belongs to one of the plurality of preset environmental information, determining a target consumer corresponding to the environmental information based on a correspondence relationship between respective preset environmental information and the non-driving consumers; and
supplying power to the driving consumer corresponding to the target driving mode and the target consumer by the low-voltage battery.

6. The method according to claim 3, wherein detecting whether the DC converter is faulty, comprises:
detecting an electrical connection state between the DC converter and the low-voltage battery, and determining that the DC converter is faulty when the electrical connection between the DC converter and the low-voltage battery is disconnected.

7. The method according to claim 3, further comprising:
obtaining a driving destination and the electric quantity of the low-voltage battery; and
determining whether the electric quantity of the low-voltage battery is sufficient for the vehicle to drive to the driving destination, and controlling the vehicle to park when the electric quantity of the low-voltage battery is insufficient for the vehicle to drive to the driving destination.

8. The method according to claim 7, further comprising:
presenting at least one parking space to the user, and based on a parking space selected by the user, controlling the vehicle to drive to the parking space and automatically park.

9. The method according to claim 7, further comprising:
determining a drivable range of the vehicle based on the electric quantity of the low-voltage battery;
obtaining a location selected by the user that is within the drivable range; and
determining the location as a new driving destination.

10. The method according to claim 7, wherein in a case that the vehicle stops power supply for the non-driving consumer, the method further comprises:
determining whether the electric quantity of the low-voltage battery is sufficient for the vehicle to drive to the driving destination, and when the electric quantity of the low-voltage battery is sufficient for the vehicle to drive to the driving destination, restoring power supply for the non-driving consumer.

11. The method according to claim 10, wherein restoring power supply for the non-driving consumer comprises:
presenting a list of non-driving consumers to be restored for power supply;
determining at least one target non-driving consumer to be restored for power supply selected by the user; and
restoring power supply for the target non-driving consumer.

12. The method according to claim 1, wherein the driving mode switching instruction comprises an instruction characterizing a switch to an automatic driving mode and an instruction characterizing a switch to a driving assistance mode.

13. An electronic device, comprising:
a memory having a computer program stored thereon; and
a processor;
wherein the processor is configured to:
in response to a driving mode switching instruction, detect whether an electric quantity of a low-voltage battery of the vehicle is higher than a preset threshold value, the preset threshold value being determined according to an electric quantity value required for the vehicle to park; and
when the electric quantity of the low-voltage battery is higher than the preset threshold value, control the vehicle to enter a target driving mode corresponding to the driving mode switching instruction.

14. The device according to claim 13, wherein the processor is further configured to:
when the electric quantity of the low-voltage battery is lower than the preset threshold value, control a traction battery to charge the low-voltage battery; and
when detecting that the electric quantity of the low-voltage battery is higher than the preset threshold value, send a driving mode inquiry message configured to inquire a user whether to enable a driving mode corresponding to the driving mode inquiry message.

15. The device according to claim 13, wherein the processor is further configured to:
detect whether a DC converter is faulty; and
in a case that the DC converter is faulty, supply power to low-voltage consumers of the vehicle in the target driving mode by the low-voltage battery.

16. The device according to claim 15, wherein the low-voltage consumers of the vehicle comprise driving consumers and non-driving consumers, and the processor is further configured to:
determine a driving consumer corresponding to the target driving mode; and
supply power to the driving consumer corresponding to the target driving mode by the low-voltage battery.

17. The device according to claim 16, wherein the processor is further configured to:
detect environmental information, and determine whether the environmental information belongs to one of a plurality of preset environmental information;
when the environmental information belongs to one of the plurality of preset environmental information, determine a target consumer corresponding to the environmental information based on a correspondence relationship between respective preset environmental information and the non-driving consumers; and supply power to the driving consumer corresponding to the target driving mode and the target consumer by the low-voltage battery.

18. The device according to claim 15, wherein detecting whether the DC converter is faulty, comprises:

detecting an electrical connection state between the DC converter and the low-voltage battery, and determining that the DC converter is faulty when the electrical connection between the DC converter and the low-voltage battery is disconnected.

19. The device according to claim 15, wherein the processor is further configured to:

obtain a driving destination and the electric quantity of the low-voltage battery; and determine whether the electric quantity of the low-voltage battery is sufficient for the vehicle to drive to the driving destination, and control the vehicle to park when the electric quantity of the low-voltage battery is insufficient for the vehicle to drive to the driving destination.

20. A non-transitory computer-readable storage medium having a computer program stored thereon, wherein the program is executed by a processor to cause the computer to execute a method for vehicle control, the method comprises:

in response to a driving mode switching instruction, detecting whether an electric quantity of a low-voltage battery of the vehicle is higher than a preset threshold value, the preset threshold value being determined according to an electric quantity value required for the vehicle to park; and when the electric quantity of the low-voltage battery is higher than the preset threshold value, controlling the vehicle to enter a target driving mode corresponding to the driving mode switching instruction.

\* \* \* \* \*